United States Patent Office 3,426,003
Patented Feb. 4, 1969

3,426,003
METHOD OF VULCANIZING BUTYL RUBBER
Robert I. Leib and Eiichi Morita, St. Albans, W. Va., assignors to Monsanto Company, St. Louis, Mo., a corporation of Delaware
No Drawing. Filed Aug. 22, 1966, Ser. No. 573,780
U.S. Cl. 260—79.5    6 Claims
Int. Cl. C08d 13/28

ABSTRACT OF THE DISCLOSURE

Butyl rubber is vulcanized with a synergistic accelerator combination of a zinc phosphorodithioate and a thiuram sulfide which combination lowers heat build-up in the Goodrich Hysteresis Test.

---

This invention relates to improved methods for accelerating the vulcanization of butyl rubber, to improved vulcanization accelerator combinations, and to improved butyl rubber products.

Butyl rubber is a synthetic rubber produced by copolymerization of at least 85% isobutene with a small proportion of not more than 15% of conjugated diene. According to Rose, The condensed Chemical Dictionary (6th ed. 1963), the conjugated diene is usually isoprene or butadiene. Its outstanding property compared with other rubbers is impermeability to gases; it is practically the only rubber used in inner tubes and similar gas-retaining applications. Sulfur or sulfur-containing compounds are used to vulcanize butyl rubber. The vulcanization of butyl rubber is slow compared to natural rubber. It is highly desirable in the rubber industry to have a fast vulcanization system to derecase the time required for vulcanization of butyl rubber. It is also desirable to have a rubber product with a low heat build-up, a low permanent set, and a high modulus.

An object of this invention is to promote the progress of science and useful arts. An object of this invention is to provide improved vulcanization accelerator combinations for butyl rubber. An object of this invention is to provide an improved butyl rubber product. A further object of this invention is to provide an improved method to accelerate the vulcanization of butyl rubber. These objects are accomplished by using a combination of a zinc phosphorodithioate and a thiuram as the vulcanization accelerator in the sulfur vulcanization of butyl rubber. Further, these objects are accomplished by using a combination of a zinc phosphorodithioate and a salt of a dithiocarbamic acid.

The zinc phosphorodithioate useful in this invention is a compund of the formula

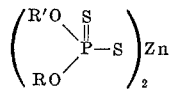

where the R and R are straight or branched alkyl, aryl, alicyclic, alkenyl, aralykyl, or alkaryl radicals of less than 19 carbon atoms. Some examples of the zinc phosphorodithioates useful in this invention are as follows:

Zinc O,O-dibutyl phosphorodithioate
Zinc O,O-diisopropyl phosphorodithioate
Zinc O,O-dipropyl phosphorodithioate
Zinc O,O-diethyl phosphorodithioate
Zinc O,O-dimethyl phosphorodithioate
Zinc O,O-bis(1,3-dimethylbutyl)phosphorodithioate
Zinc O,O-bis(2-ethylhexyl)phosphorodithiate
Zinc O,O-bis(4-methylpentyl)phosphorodithioate
Zinc O,O-ditridecyl phosphorodithioate
Zinc O,O-diamyl phosphorodithioate
Zinc O,O-dihexyl phosphorodithioate
Zinc O,O-dilauryl phosphorodithioate
Zinc O,O-dioctadecyl phosphorodithioate
Zinc O,O-dioctyl phosphorodithioate.

The thiuram useful in this invention is a compound of the formula

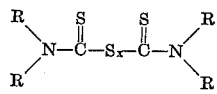

where the R's are alkyl or alicyclic radicals containing 1 to 9 carbon atoms. The R's on the same nitrogen can form a ring with the nitrogen atom, and the ring contains from 4 to 9 carbon atoms. In addition, the R's on the same nitrogen can form a ring with the nitrogen of morpholine or 2,6-dimethylmorpholine. The $x$ can be a number from 1 to 4. Some examples of the thiurams useful in this invention are as follows:

Tetramethylthiuram monosulfide
Tetramethylthiuram disulfide
Tetramethylthiuram trisulfide
Tetramethylthiuram tetrasulfide
Tetraethylthiuram monosulfide
Tetraethylthiuram disulfide
Tetraethylthiuram trisulfide
Tetraethylthiuram tetrasulfide
Tetrapropylthiuram monosulfide
Tetrapropylthiuram disulfide
Tetrapropylthiuram trisulfide
Tetrapropylthiuram tetrasulfide
Tetraisopropylthiuram monosulfide
Tetraisopropylthiuram disulfide
Tetraisopropylthiuram trisulfide
Tetraisopropylthiuram tetrasulfide
Tetrabutylthiuram monosulfide
Tetrabutylthiuram disulfide
Tetrabutylthiuram trisulfide
Tetrabutylthiuram tetrasulfide Thiurams are known to be accelerators for the vulcanization of rubber.

We have discovered that the use of combinations of a zinc phosphorodithiate and a thiuram as vulcanization accelerators in butyl rubber stocks gives lower heat buildup, lower permanent set, and a higher modulus compared to butyl rubber stocks using these compounds alone as vulcanization accelerators. These results are unexpected.

The tables, infra, illustrate the invention in greater detail and the best mode for carrying it out but are not to be construed as to narrow the scope of our invention. The curing characteristics are determined from the time required to cure butyl rubber stocks at 153° C. Curing characteristics are determined by means of the Monsanto Oscillating Disk Rheometer described by Decker, Wise, and Guerry in Rubber World, December 1962, p. 68. From the Rheometer data $t_2$ is the time in minutes for a rise of two Rheometer units above the minimum reading and $t_{95}$ is the time required to obtain a torque 95% of the maximum. RMT is the Rheometer maximum torque in Rheometer units.

The moduli at 300% elongation reported in Table I, infra, are obtained using the method of the American Society for Testing and Materials (ASTM) Designation, D412–64T. The method covers the determination of the effect of the application of a tension load to a vulcanized sample of butyl rubber obtained using an eccelerator combination of this invention. The modulus at 300 % elongation is calculated as follows:

Modulus at 300% elongation in lbs./in.$^2$ =

$$\frac{\text{force at } 300\%}{\text{original cross-sectional area of the sample}}$$

The test is reported in detail in the 1966 Book of ASTM Standards, Part 28, pp. 197–208.

The Goodrich hysteresis and Goodrich permanent set reported in Table II, infra, are obtained using the method of the ASTM Designation, D623–62. These methods are for use in comparing the rate of heat generation and the fatigue characteristics of vulcanized samples of butyl rubber obtained using an accelerator combination of this invention. The Goodrich Flexometer was used for these tests. In this device, a definite compressive load is applied to a test sample through a lever system having high inertia, while imposing on the specimen an additional high-frequency cyclic compression of definite amplitude. The increase in temperature at the base of the test sample is measured with a thermocouple to provide a relative indication of the heat generated in flexing the sample. The change in height of the test sample measured after the test gives the permanent set. The tests are reported in detail in the 1966 Book of ASTM Standards, Part 28, pp. 334–341.

The butyl rubber stocks in the tables are comprised of the following masterbatch:

| | Parts by weight |
|---|---|
| Butyl 217[1] | 100.0 |
| Intermediate super abrasion furnace carbon black | 40.0 |
| Zinc oxide | 5.0 |
| Stearic acid | 1.0 |
| Saturated oil hydrocarbon softener | 10.0 |
| Sulfur | 1.0 |
| Total | 157.0 |

Tetramethylthiuram monosulfide as indicated, infra.
Zinc O,O-dibutyl phosphorodithioate as indicated, infra.

There are six butyl rubber stocks in the tables. The stocks vary in accelerator concentration as follows:

| Stock | 1 | 2 | 3 | 4 | 5 | 6 |
|---|---|---|---|---|---|---|
| Tetramethylthiuram monosulfide (parts by weight) | 00.0 | 0.50 | 1.00 | 1.50 | 2.00 | 2.50 |
| Zinc O,O-dibutyl phosphorodithioate (parts by weight) | 2.50 | 2.00 | 1.50 | 1.00 | 0.50 | 0.00 |

TABLE I

| Stock | Cure time at 153° C. (minutes) | Modulus at 300% elongation (lbs./in.$^2$) | Ultimate tensile strength (lbs./in.$^2$) | Ultimate elongation, percent |
|---|---|---|---|---|
| 1 | 65 | 540 | 2,400 | 760 |
|   | 90 | [1] 530 | [1] 2,500 | [1] 750 |
| 2 | 50 | 760 | 2,600 | 690 |
|   | 70 | [1] 740 | [1] 2,600 | [1] 670 |
| 3 | 40 | 930 | 2,600 | 610 |
|   | 65 | [1] 950 | [1] 2,600 | [1] 590 |
| 4 | 40 | 980 | 2,600 | 600 |
|   | 55 | [1] 1,100 | [1] 2,500 | [1] 570 |
| 5 | 25 | 760 | 2,500 | 650 |
|   | 40 | [1] 830 | [1] 2,300 | [1] 580 |
| 6 | 25 | 790 | 2,200 | 600 |
|   | 50 | [1] 920 | [1] 2,200 | [1] 550 |

[1] Physical properties obtained by vulcanizing to the time required to reach Rheometer maximum torque. The remaining numbers represent physical properties obtained by vulcanizing to the time required to reach 95% Rheometer maximum torque.

TABLE II GOODRICH HYSTERESIS

| Stock: | Δt° C.[2] |
|---|---|
| 1 | [1] 52 |
| 2 | 52 |
| 3 | 19 |
| 4 | 16 |
| 5 | 20 |
| 6 | 27 |

[1] The stock of Experiment 1 was very soft. Δt was 52° C. when the sample slipped out of the Flexometer.
[2] Δt was measured from a starting temperature of 100° C.

GOODRICH PERMANENT SET

| Stock: | Percent change from stock's original height |
|---|---|
| 1 | (1) |
| 2 | 20 |
| 3 | 16 |
| 4 | 14 |
| 5 | 20 |
| 6 | 24 |

[1] The stock of Experiment 1 was too soft to measure accurately.

TABLE III.—RHEOMETER AT 153° C.

| Stock | 1 | 2 | 3 | 4 | 5 | 6 |
|---|---|---|---|---|---|---|
| RMT | 42.0 | 40.3 | 45.0 | 46.1 | 42.8 | 41.7 |
| $t_3$ Minutes | 8.3 | 8.8 | 8.9 | 8.9 | 8.8 | 9.1 |
| $t_{95}$ Minutes | 66.2 | 49.0 | 38.1 | 38.0 | 26.5 | 21.7 |

The Goodrich permanent set measurements of Stocks 2, 3, 4, and 5 containing the accelerator combinations of this invention are significantly lower than the measurements of Stocks 1 and 6 containing the compounds alone in butyl rubber. The differences in temperature in the Goodrich hysteresis of Stocks 3, 4, and 5 containing the accelerator combinations of this invention are significantly lower than the differences in temperature of Stocks 1 and 6 containing the compounds alone in butyl rubber. These results are shown in Table II. These differences in temperature are a measure of heat buildup in the rubber stock. Significantly higher moduli at 300% elongation are obtained using the accelerator combinations of this invention compared to the stocks containing the compounds alone in butyl rubber. These results are shown in Table I.

The vulcanization accelerator combinations of Stocks 2, 3, 4, and 5 decrease the time required for vulcanization significantly compared to Stock 1 containing zinc O,O-dibutyl phosphorodithioate alone. These results are shown by $t_{95}$ in the Rheometer data of Table III. Although tetramethylthiuram monosulfide alone decreases the time required for vulcanization, the butyl rubber stocks vulcanized with this compound alone do not possess the improved properties of low heat buildup and low permanent set demonstrated by using the combinations of this invention.

It is preferred that the thiuram constitute 20%–80% by weight of the combination of thiuram and zinc phosphorodithioate and the latter 80%–20%. Accelerating effect is observed over a wide range of total accelerator, for example 0.1%–10.0% of total accelerator, but at least 1.0 part per hundred parts of butyl rubber is preferred. Although the thiurams are preferred in the combinations of this invention because of better processing safety, similar improvement of modulus and tensile properties and reduction in hysteresis and permanent set are obtained by use of salts of dithiocarbamic acids in conjunction with zinc phosphorodithioate accelerators. The salts of dithiocarbamic acids comprise a well-known class of accelerators. Suitable examples for use in practice of the invention comprise zinc dimethyl dithiocarbamate, zinc dibutyl dithiocarbamate, zinc diethyl dithiocarbamate, cadmium diethyl dithiocarbamate, selenium diethyl dithiocarbamate, tellurium diethyl dithiocarbamate, piperidinium pentamethylene dithiocarbamate, and N,N-dimethylcyclohexylamine salt of dibutyl dithiocarbamic acid.

Compared to the highly unsaturated rubbers, butyl rubber requires a high dosage of accelerator to obtain acceptable properties within a reasonable time of cure. For economic reasons, the zinc phosphorodithioates are much preferred in practice of the present invention. While the invention has been described with regard to zinc phosphorodithioates, other salts may be used with similar results. Phosphorodithioate accelerators were described by Romieux and Christmann, U.S. Patent 1,867,631, July 19, 1932, and may be used in the practice of the invention. Furthermore, the sub-group of butyl rubber stabilizers described by Merrifield and Hill, U.S. Patent 2,906,731, Sept. 29 1959 are useful in practice of the invention. The mutually reinforcing accelerating combinations of the present invention are useful in butyl rubber whether vulcanized alone or in admixture with other rubbers, as for example, ethylene-propylene terpolymer rubber. The butyl rubber formulation selected to illustrate the invention is not to be taken as limitative. The invention is particularly valuable for accelerating white butyl rubber stocks containing clay.

It is intended to cover all changes and modifications of the examples of the invention herein chosen for purposes of disclosure which do not constitute departures from the spirit and scope of the invention.

We claim:
1. A method of vulcanizing butyl rubber which comprises:
   mixing the butyl rubber with a sulfur-containing vulcanizing agent and an accelerating amount of a vulcanization accelerator consisting essentially of a combination of a
   zinc phosphorodithioate of the formula

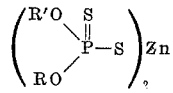

wherein R and R' are alkyl, aryl, alicyclic, alkenyl, aralkyl, or alkaryl of less than 19 carbon atoms and a thiuram of the formula

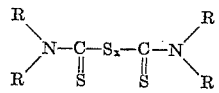

wherein the R's are alkyl or alicyclic containing 1 to 9 carbon atoms, the R's on the same nitrogen form a ring with the nitrogen containing 4 to 9 carbon atoms, and the R's on the same nitrogen form a ring with the nitrogen of morpholine or 2,6-dimethylmorpholine, and $x$ is a number from 1 to 4; and
   heating the mixture at vulcanizing temperature.

2. A method of vulcanizing butyl rubber according to claim 1 wherein the accelerator combination consists essentially of the compounds zinc O,O-dibutyl phosphorodithioate and tetramethylthiuram monosulfied.

3. A method of vulcanizing butyl rubber according to claim 1 wherein the accelerator combination consists essentially of the compounds zinc O,O-dibutyl phosphorodithioate and tetramethylthiuram disulfide.

4. A method of vulcanizing butyl rubber according to claim 1 wherein the accelerator combination consists essentially of the compounds zinc O,O-dipropyl phosphorodithioate and tetramethylthiuram monosulfide.

5. A method of vulcanizing butyl rubber according to claim 1 wherein the accelerator combination consists essentially of the compounds zinc O,O-diisopropyl phosphorodithioate and tetramethylthiuram monosulfide.

6. A method of vulcanizing butyl rubber according to claim 1 wherein the accelerator combination consists essentially of the compounds zinc O,O-diethyl phosphorodithioate and tetramethylthiuram monosulfide.

References Cited
UNITED STATES PATENTS
3,036,050 5/1962 D'Amico _____ 260—79.5
3,308,103 3/1967 Coran et al. _____ 260—79.5

JAMES A. SEIDLECK, *Primary Examiner.*

U.S. Cl. X.R.
260—41.5, 23.7